United States Patent [19]
Drouin

[11] Patent Number: 5,550,685
[45] Date of Patent: Aug. 27, 1996

[54] APPLYING AN ADAPTIVE FEED-FORWARD ALGORITHM AS A FREQUENCY SELECTIVE FILTER IN A CLOSED LOOP DISK DRIVE SERVO SYSTEM IN ORDER TO COMPENSATE FOR PERIODIC PERTURBATIONS WHICH OTHERWISE APPEAR IN THE SERVO SYSTEM POSITION ERROR SIGNAL

[75] Inventor: David M. Drouin, Fremont, Calif.

[73] Assignee: Syquest Technology, Inc., Fremont, Calif.

[21] Appl. No.: 141,822

[22] Filed: Oct. 22, 1993

[51] Int. Cl.⁶ ................................................. G11B 5/596
[52] U.S. Cl. ................................. 360/77.08; 360/77.04
[58] Field of Search ........................... 360/77.04, 77.05, 360/77.06, 77.08, 31, 77.03, 73.05, 78.06, 78.09, 78.11, 105; 369/32; 364/164

[56] References Cited

U.S. PATENT DOCUMENTS

| | | | |
|---|---|---|---|
| 4,594,622 | 6/1986 | Wallis | 360/77.08 X |
| 4,598,327 | 7/1986 | Jen et al. | 360/77.08 X |
| 4,628,379 | 12/1986 | Andrews, Jr. et al. | 360/77.05 |
| 4,755,977 | 7/1988 | Abed | 369/32 |
| 4,890,172 | 12/1989 | Watt et al. | 360/77.04 |
| 4,914,725 | 4/1990 | Belser et al. | 360/77.06 X |
| 5,204,793 | 4/1993 | Plonczak | 360/105 X |
| 5,233,487 | 8/1993 | Christensen et al. | 360/77.04 |

*Primary Examiner*—Aristotelis Psitos
*Assistant Examiner*—Patrick Wamsley
*Attorney, Agent, or Firm*—Lyon & Lyon

[57] ABSTRACT

A method for applying an adaptive feed-forward waveform correction to a primary servo loop compensation signal in a rotating data storage apparatus. A position error signal is used to determine a fixed feed-forward correction upon initialization or other predetermined conditions. An adaptive feed-forward waveform correction is periodically determined by adding a scaled version of the position error signal to the stored adaptive feed-forward value, and then processing the resulting sum through a frequency selective filter. The stored adaptive feed-forward correction is then updated with this new result. Simultaneously, the updated adaptive feed-forward correction is combined with the fixed feed-forward correction and the position error signal to generate a primary servo loop compensation signal for controlling the read/write head of the data storage apparatus.

20 Claims, 4 Drawing Sheets

APPLYING AN ADAPTIVE FEED-FORWARD ALGORITHM AS A FREQUENCY SELECTIVE FILTER IN A CLOSED LOOP DISK DRIVE SERVO SYSTEM IN ORDER TO COMPENSATE FOR PERIODIC PERTURBATIONS WHICH OTHERWISE APPEAR IN THE SERVO SYSTEM POSITION ERROR SIGNAL

TECHNICAL FIELD

The present invention generally relates to servo methods useful for performing read/write head position offset correction in a rotating data storage apparatus. More specifically, the present invention comprises a method for use in a disk drive servo system, wherein an adaptive feed-forward algorithm employing discrete fourier transform techniques is implemented to monitor servo samples. The algorithm acts as a frequency selective filter which operates independently with respect to the primary servo loop, separating noise from correctable periodic perturbations such as runout detected in the mechanical plant of the drive. The algorithm also computes correction values in response to the perturbations, thereby furnishing a means for enhancing the accuracy of servo compensation during successive revolutions of the data storage disk.

BACKGROUND ART

Control of the read/write head position in a disk drive relative to track centerline on the disk is necessary to insure accuracy of the disk drive read and write operations. Over the years, many types of servo systems have been devised to detect and correct misalignment between the head and track centerline. One type of disk drive servo system is known as a sampled servo system. In such a closed-loop track-following system, servo information in the form of burst patterns is recorded in one or more servo sectors on each disk track. The servo information is read by the head during servo operations at each servo sector and used to generate position error signals as a function of the offset between the head and the disk track centerline. The position error signals are input to a microprocessor. The microprocessor in turn performs appropriate calculations with the position error signals and outputs servo compensation signals which control the disk drive head positioning mechanism to place the read/write heads over track centerline. The entire closed-loop arrangement is often characterized as the disk drive primary servo loop.

The predictable and periodic motion of a point at track centerline on the rotating disk surface relative to a fixed point on the disk drive base plate is known as the repeatable runout signature. Repeatable runout is caused by static offsets or perturbations of some sort in the mechanical portion of the disk drive "plant" consisting of the spindle motor, head positioning mechanism and related electronics. The position error signals generated for the primary servo loop at each servo sector contain the repeatable runout signature in combination with non-repeatable servo information, and represent the misalignment between the head and track centerline. When the magnitude of misalignment between the head and track centerline exceeds some maximum level, the primary servo loop may not be able to reduce the misalignment to within the tolerances required by the drive. It is thus often necessary to reduce the amount of repeatable runout using methods independent of the primary servo loop operation.

In order to reduce repeatable runout independent of the primary servo loop, some prior art disk drive servo control systems have utilized open-loop "static" feed-forward techniques to process position error signals received during servo operations and generate appropriate feed-forward corrections. Specifically, feed-forward correction is accomplished by detecting and measuring repeatable runout (using frequency selective filters based on discrete fourier transforms or the like) and then computing a feed-forward correction waveform which consists of a series of discrete feed-forward correction values, one for each servo sector, to be applied to the servo compensation signal. Specifically, at each servo sector the corresponding feed-forward correction value, which is proportional to measured repeatable runout, is added algebraically to the conventional primary servo loop compensation signal at that servo sector to account for repeatable runout present in the mechanical plant of the disk drive.

Servo systems which rely on so-called static feed-forward techniques often sample and average the position error signals across a number of disk revolutions to obtain an accurate measurement of the repeatable runout before computations to correct for repeatable runout can be performed. Typically, in a removable cartridge disk drive the feed-forward correction waveform is determined once at each cartridge insertion and may thereafter be redetermined only when some major event (e.g., power interruption or excessive shock to the drive) occurs requiring recalibration.

Any relative movement between the disk surface and the head positioning mechanism (a rigid structure attached to the disk drive base plate) results in a change in repeatable runout signature. This is a problem for "static" feed-forward techniques because the recalibration required to account for changes in repeatable runout impacts on drive performance. Complicating matters, as the disk drive art advances, track density, measured in tracks per inch (TPI), continues to increase while the mechanical plant is packaged into smaller and smaller form factors. Mechanical forces, for example friction and stiction associated with the spindle motor and head positioning motor ballbearings, become more pronounced in a relative sense, creating unacceptable instability in the plant characteristics. The non-linear perturbations caused by such forces, though extremely small in an absolute sense, are becoming so pervasive that servo systems utilizing static feed-forward techniques no longer provide adequate servo compensation.

In the frequency spectrum of the repeatable runout signature, the frequency components of interest for purposes of feed-forward correction normally lie at or below the rotational frequency of the disk, but under some conditions (e.g., unbalanced or warped disks or unfavorable mounting conditions caused by mounting warpage, spindle dynamics or the like) may also occur at frequencies above the disk rotational frequency. The "static" feed-forward algorithm operates to reduce the level of repeatable runout occurring in the position error signals at all frequencies of interest.

However, because the "static" feed-forward correction waveform is updated on an infrequent basis, conventional feed-forward correction techniques cannot keep track of mechanical plant changes and attendant position errors which arise over time while the disk drive is in operation. Hence, it would be highly desirable to provide a means for dynamically updating the feed-forward correction waveform otherwise applied to the compensation signal generated in the primary servo of the disk drive, which means takes account of any change in the character of the repeatable runout frequency components.

It is accordingly an object of the present invention to minimize the position error at the repeatable runout frequencies, whereby the read/write head remains over the track centerline to within the required tolerances.

It is a further object of the present invention to supply an adaptive feed-forward algorithm which, when employed in conjunction with a primary closed-loop or track-following sampled servo system, has sufficient bandwidth to track servo system mechanical plant variations and corresponding changes in the repeatable runout signature at the frequency components of interest.

These and other objects of the present invention are achieved in a servo system which implements a novel adaptive feed-forward algorithm. The adaptive feed-forward algorithm monitors the repeatable runout left uncorrected by the primary track-following servo system and periodically updates a feed-forward correction waveform as appropriate. In a preferred embodiment of the present invention, repeatable runout is measured over a single disk revolution. Subsequent feed-forward correction values based upon these measurements are computed and applied over the next succeeding disk revolution. The measurement and computing processes are thereafter repeated in continuous cycles while the disk drive performs its read and write duties. The rate at which the measurement/computing cycles occur and the gain at which the feed-forward corrections are accumulated directly determines the maximum overall adaptive feed-forward bandwidth achievable. In the case of a two revolution cycle time, the maximum adaptive bandwidth is one-half the rotational frequency of the disk.

The measurement of repeatable runout left uncorrected by the primary track-following servo loop is obtained by adding an adaptive feed-forward correction value from a current adaptive feed-forward correction waveform to the position error signal at each servo sector. A discrete fourier transform is performed on the resulting sum at each frequency of interest. Real and imaginary terms are accumulated over the sample interval for each sampled servo sector on the track. The accumulated real and imaginary terms are thereafter used to reconstruct a waveform correction corresponding to the repeatable runout at the frequencies of interest.

In a preferred embodiment of the present invention, the sample interval is a full revolution of the disk and the waveform correction is a pure sine wave at the primary runout frequency (i.e., the rotational frequency of the disk). The value of the waveform correction at each servo sector is applied, either directly or indirectly, to the primary servo loop compensation signal at each servo sector and simultaneously stored in a table as the current adaptive feed-forward correction value. The entire process, which essentially comprises a frequency-selective filter or filters at the frequencies of interest (e.g., a bandpass filter at runout frequency in the preferred embodiment), is thereafter repeated at some periodic interval.

BRIEF DESCRIPTION OF THE DRAWINGS

The various objects, features and advantages of the present invention will be better understood by examining the descriptive Best Mode For Carrying Out The Invention found below, together with the attached Drawings, wherein.

BEST MODE FOR CARRYING OUT THE INVENTION

As noted above, the goal of the primary track-following servo loop in a disk drive is to provide servo compensation signals which can be used to correct misalignment between the read/write head (more properly the read/write head gap) of the disk drive and track centerline on the disk surface. The primary servo loop reduces (i.e., compensates for) a large portion of the repeatable runout error observed in the disk drive. If the gain of the servo loop at the primary runout frequency is $G_s$, the level $E_c$ of the original error $E_x$ corrected by the primary servo loop will be $E_c = E_x - (E_x/G_s)$, and the error left uncorrected is $E_u = (E_x/G_s)$. Specifications for a given servo system require that the uncorrected error, $E_u$, be below some absolute level.

Practical limitations nevertheless put restraints on the amount of servo loop gain that can be realized at any particular frequency of interest. In addition, there are mechanical tolerance issues that place a lower limit on the level of repeatable runout that will be experienced. As a result, some type of feed-forward algorithm is needed to reduce the repeatable runout error as an independent function outside of the primary servo loop. This can be achieved by applying a feed-forward correction to the position error left uncorrected by the primary servo loop. The same loop gain, $G_s$, yields an uncorrected error of $E_u = [(E_x/G_{ff})/G_s]$ at the primary runout frequency, where $G_{ff}$ is the effective gain of the feed-forward compensation. The effective gain, $G_{ff}$, can be quite high and is limited primarily by the overall resolution, dynamic range and signal-to-noise performance of the servo system.

The adaptive feed-forward algorithm of the present invention is specifically implemented in a state machine architecture. At each servo sector sampling interval, the appropriate state is executed as soon as the time-critical firmware operations of the primary track-following servo loop are completed. A discrete fourier transform (DFT)/inverse discrete fourier transform (IDFT) process is used to implement a bandpass filter at runout frequency, yielding a sinusoid that best fits the measured position error signal. The bandwidth requirements in the preferred embodiment are such that updates to the feed-forward correction waveform every two disk revolutions are sufficient. Bandwidth can be increased up to a maximum when a "continuous" DFT/IDFT is performed, giving a new best fit sinusoid at every sample cycle.

Figure 1:
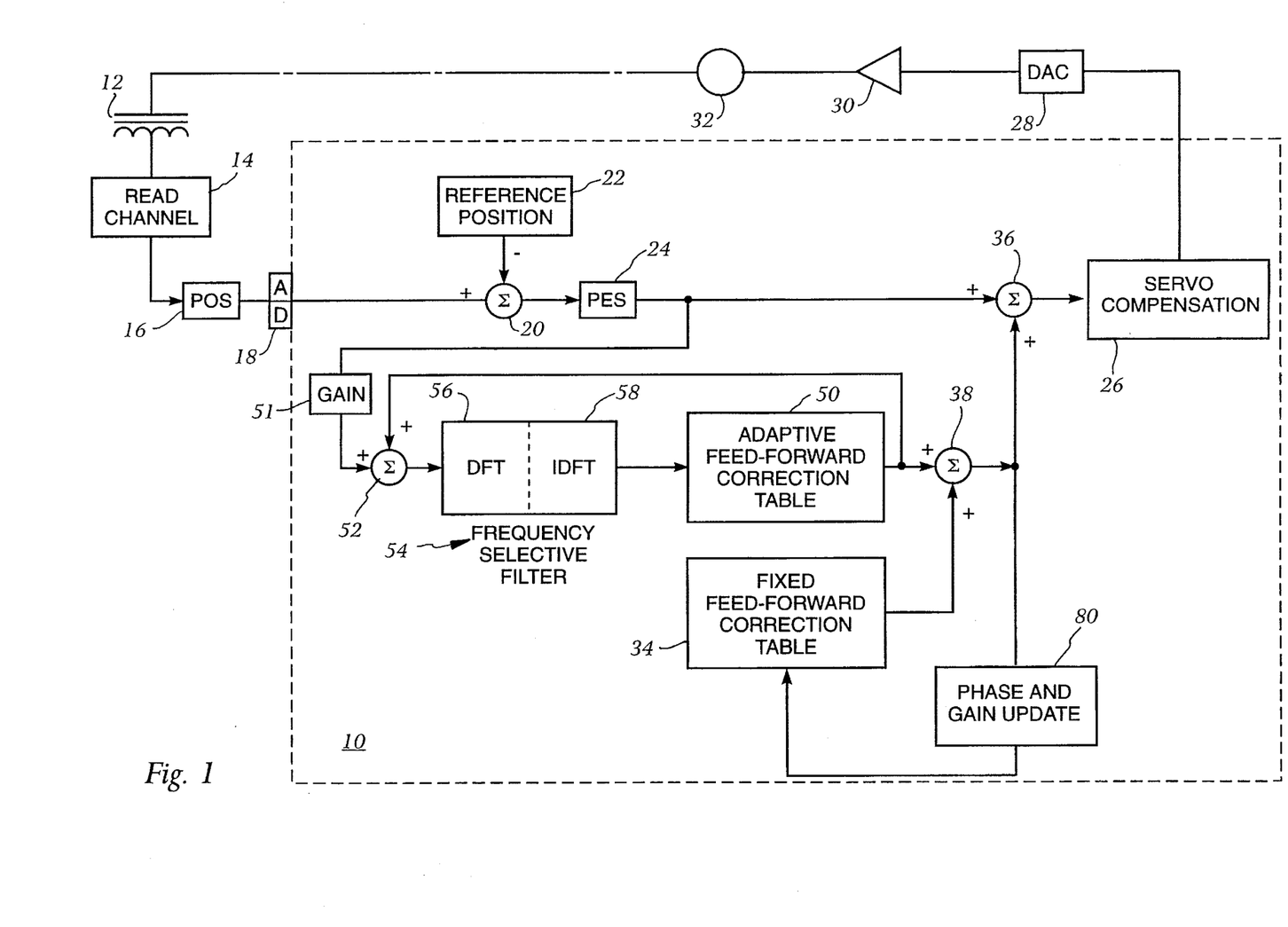
FIG. 1 is a block diagram of a servo compensation operation which utilizes the adaptive feed-forward algorithm of the present invention.

FIG. 1 illustrates the implementation of the adaptive feed-forward algorithm of the present invention in conceptual fashion. A state machine 10 (e.g., a microprocessor) controls the servo operation in the disk drive. Normally, servo operation is initiated when the disk drive head 12 reads the servo data recorded in the servo sectors around the data track. The servo data read by the head at each servo sector are processed in read channel circuitry 14 to generate position signals representative of the read/write head gap position relative to track centerline, as indicated at 16. These position signals are input to the state machine via A-to-D converter 18 and are algebraically combined at junction 20 with a reference position value, indicated at 22, to produce a position error signal, indicated at 24. The reference position value, which remains constant over the disk revolution, establishes the desired position of the head relative to track centerline, and is normally zero (meaning the desired location of the read/write head gap is directly over track centerline) for most disk drive operations.

The primary servo loop in the disk drive uses conventional servo processing techniques, as indicated at 26, to derive a servo compensation signal from the position error signal 24. Such servo processing techniques are well known to those of ordinary skill in the art and thus are not described further. The servo compensation signal is output from state machine 10 and converted to an analog compensation value via digital-to-analog converter 28. The analog compensation value is supplied to driver circuitry 30 which actuates the mover 32 (e.g., a voice-coil motor) in the head positioning mechanism (not shown) to bring the head back into alignment with the reference position, normally track centerline. The primary servo loop operation is repeated at each servo sector, resulting in realignment of the head at each servo sector interval throughout each disk revolution.

Figure 2:
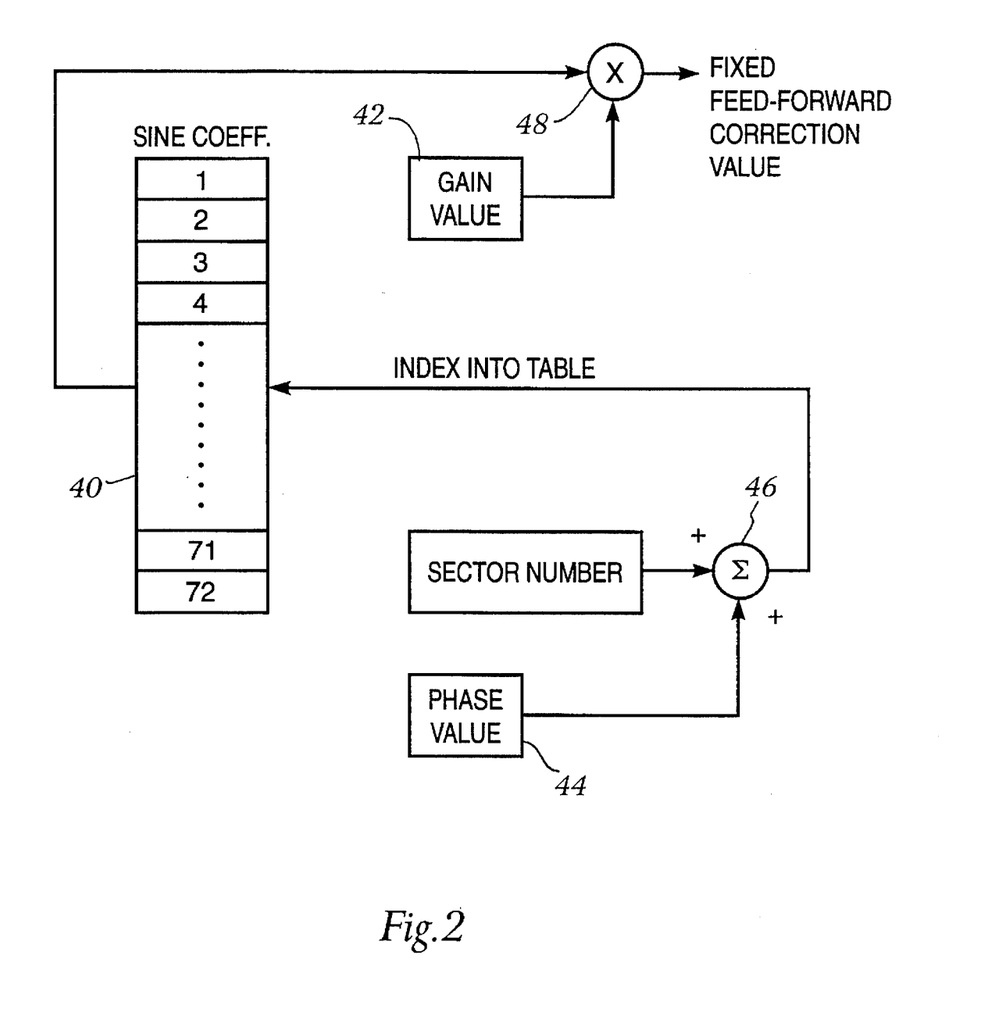
FIG. 2 is a conceptual view of the manner of determining a fixed feed-forward correction value for application to the compensation signal of the primary track-following servo loop.

A fixed feed-forward correction value is computed at each servo sector interval during a calibration phase of disk drive operation (e.g., at power up or new disk cartridge insertion) and stored in fixed feed-forward correction table 34 for application to the position error signal at summing junction 36 via summing junction 38. FIG. 2 illustrates in conceptual fashion the manner in which the fixed feed-forward correction values are computed. During the calibration phase, which typically takes place at disk drive initialization, the data tracks on the disk surface are divided into zones. A track is selected within each zone and the position error signal obtained from the servo sample at each servo sector in the selected track is averaged over a predetermined number of disk revolutions. The averaged position error signals for all of the servo sectors along the selected track in each zone are then subjected to a discrete fourier transform at the frequencies of interest.

Specifically, the averaged position error signals associated with each zone comprise the repeatable runout signature. The averaged position error signal waveform is compared with a normalized sine wave (a pure 90 Hz sine wave in the preferred embodiment) stored in constant sine value table 40. Table 40 contains a sine value for each servo sector along the selected track in the zone of interest. This comparison yields gain and phase values for each zone which can be used during a reconstruction phase to compute the fixed feed-forward correction waveform.

The gain value is determined by performing a "best fit" between the averaged position error signal waveform and a scaled version of the normalized sine wave. The "best fit" procedure is carried out as follows. A cumulative difference value is derived by adding up the absolute difference between the value of the averaged position error signal waveform and the normalized sine wave for each of the servo sectors along the selected track in the zone of interest. This process is repeated using scaled versions of the normalized sine wave obtained by multiplying the normalized sine wave with a series of decreasing gain factors. The cumulative difference values derived for each of the scaled normalized sine waves are compared with one another. The lowest cumulative difference value yields the scaled normalized sine wave which "best fits" the averaged position error signal waveform. The gain factor associated with this "best fit" scaled normalized sine wave is loaded into register 42 to become the gain value for the zone of interest.

The phase value for the zone of interest is likewise determined in a "best fit" manner. That is, the normalized sine wave scaled with the gain value loaded into register 42 is phase shifted in single sector increments while a cumulative difference value is derived for each of the various phase shifts by adding up the absolute difference between the value of the averaged position error signal waveform and the properly scaled, phase-shifted normalized sine wave for each of the servo sectors along the selected track in the zone of interest. Again, the lowest cumulative difference value yields the scaled, now phase-shifted normalized sine wave which "best fits" the averaged position error signal waveform. The amount of phase shift between the "best fit" scaled, phase-shifted normalized sine wave and the normalized sine wave stored in table 40 is measured by counting the number of servo sectors between, e.g., the 0° occurrence of the normalized sine wave and the 0° occurrence on the "best fit" scaled, phase-shifted normalized sine wave to determine a phase value for each zone, which phase value is loaded into a register 44.

Thereafter, when the disk drive is operating in its read or write mode, the read/write head is positioned over a track in one of the zones on the disk surface and the fixed feed-forward correction value is computed at each servo sector interval along the track. The computation involves selecting the normalized sine wave coefficient at an index number which is determined by adding the phase value for the zone in which the track lies to the number of the servo sector over which the head is currently disposed, as indicated at 46. The selected sine coefficient at the index number is multiplied by the gain value associated with the zone of interest, as indicated at 48, to arrive at the final fixed feed-forward correction value. This final fixed feed-forward correction value is added to the primary servo loop compensation signal at junctions 38 and 36, as previously noted.

Returning to FIG. 1, the adaptive feed-forward algorithm of the present invention provides additional correction to the servo compensation signal as a function of measured repeatable runout left uncorrected by the primary track-following servo loop. In a preferred embodiment of the present invention, state machine 10 executes the adaptive feed-forward algorithm at every servo sample interval across a disk revolution (e.g., seventy-two times per revolution for a disk with a seventy-two servo sector format) and computes an adaptive feed-forward correction waveform. The value of the adaptive feed-forward correction waveform at each servo sector is added to the fixed feed-forward correction value at each servo sector to yield a combined feed-forward correction value. The combined feed-forward correction value for the servo sector is subsequently applied to the servo compensation signal used to control the head positioning mechanism. The adaptive feed-forward correction waveform is stored in an adaptive feed-forward correction table 50 by the state machine and updated every correction cycle, providing continuous correction for otherwise uncorrected repeatable runout.

The adaptive feed-forward correction waveform values are obtained by applying the adaptive feed-forward algorithm of the present invention to the position error signals generated during servo operations. The position error signals produced in the state machine, as indicated at 24, are multiplied by a gain factor, as indicated at 51. The gain factor, which is a function of the plant characteristics and is determined empirically through testing of the disk drive itself, serves to limit the bandwidth of the feed-forward correction. After multiplication by the gain factor, the now-scaled position error signals are sent to a summing junction 52 where they are added to the previously stored correction value from adaptive feed-forward correction table 50. The output of the summing operation at summing junction 52 is processed in a frequency selective filter, as indicated at 54.

The frequency selective filter operates in two phases: a measurement phase, indicated at 56, and a reconstruction phase, indicated at 58. The measurement phase is a single frequency discrete fourier transform which essentially involves multiplying the output of summing junction 52 by cosine and sine coefficients at each servo sector sample and accumulating the multiplication results (which respectively represent real and imaginary terms) over a full disk revolution. The reconstruction phase is performed using a single frequency inverse discrete fourier transform which involves multiplication of the discrete fourier transform results (i.e., the real and imaginary terms) with the sine and cosine coefficients. The output of the inverse discrete fourier transform operation is loaded into the adaptive feed-forward correction table 50 and supplied to summing junction 38 for addition to the fixed feed-forward correction value. The combined correction value is added at junction 36 to the position error signal measured at each servo sample.

Figure 3:
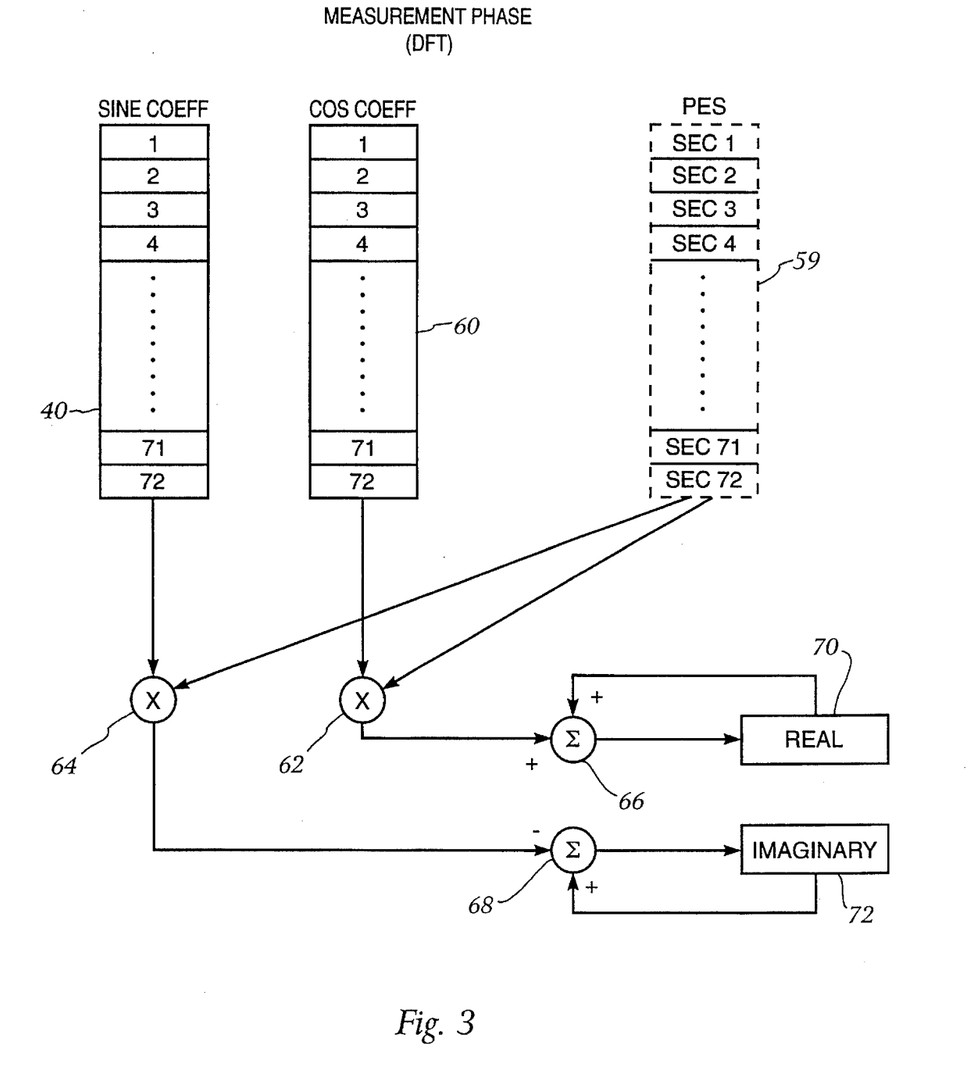
FIG. 3 is a conceptual view of the measurement phase associated with the adaptive feed-forward algorithm of the present invention.

FIG. 3 illustrates in conceptual fashion the measurement phase 56 of the frequency selective filter, during which the discrete fourier transform is performed on the output of summing junction 52. Each time a position error signal associated with a sector sample is received by state machine 10 and passed through summing junction 52, as indicated at 59, the resulting signal is multiplied by cosine and sine coefficients corresponding to that particular servo sector. The cosine and sine coefficients are taken from constant value tables, respectively indicated at 60 and 40 in FIG. 3. The multiplication operation, conceptually illustrated at 62 and 64, provides multiplication results consisting of a real term and an imaginary term which are algebraically accumulated over a full disk revolution.

Specifically, the real and imaginary terms computed as multiplication results from the multiplication operation in the measurement phase of the frequency selective filter are respectively fed to summing junctions 66, 68 and thereafter input to holding registers 70, 72. The contents of the holding registers 70, 72 are algebraically summed at 66, 68 with the next multiplication result obtained at the next servo sector. Thus, at the end of a complete disk revolution, holding register 70 contains a single real term value representing the accumulated multiplication results associated with the cosine coefficients while holding register 72 contains a single imaginary term value representing the accumulated multiplication results associated with the sine coefficient.

In a preferred embodiment of the present invention, the measurement phase which occurs immediately following track seek to a new destination track may involve only a single disk revolution. The subsequent measurement phase may be extended for up to eight disk revolutions in order to improve the immunity of the measurement operation to external vibration.

Figure 4:
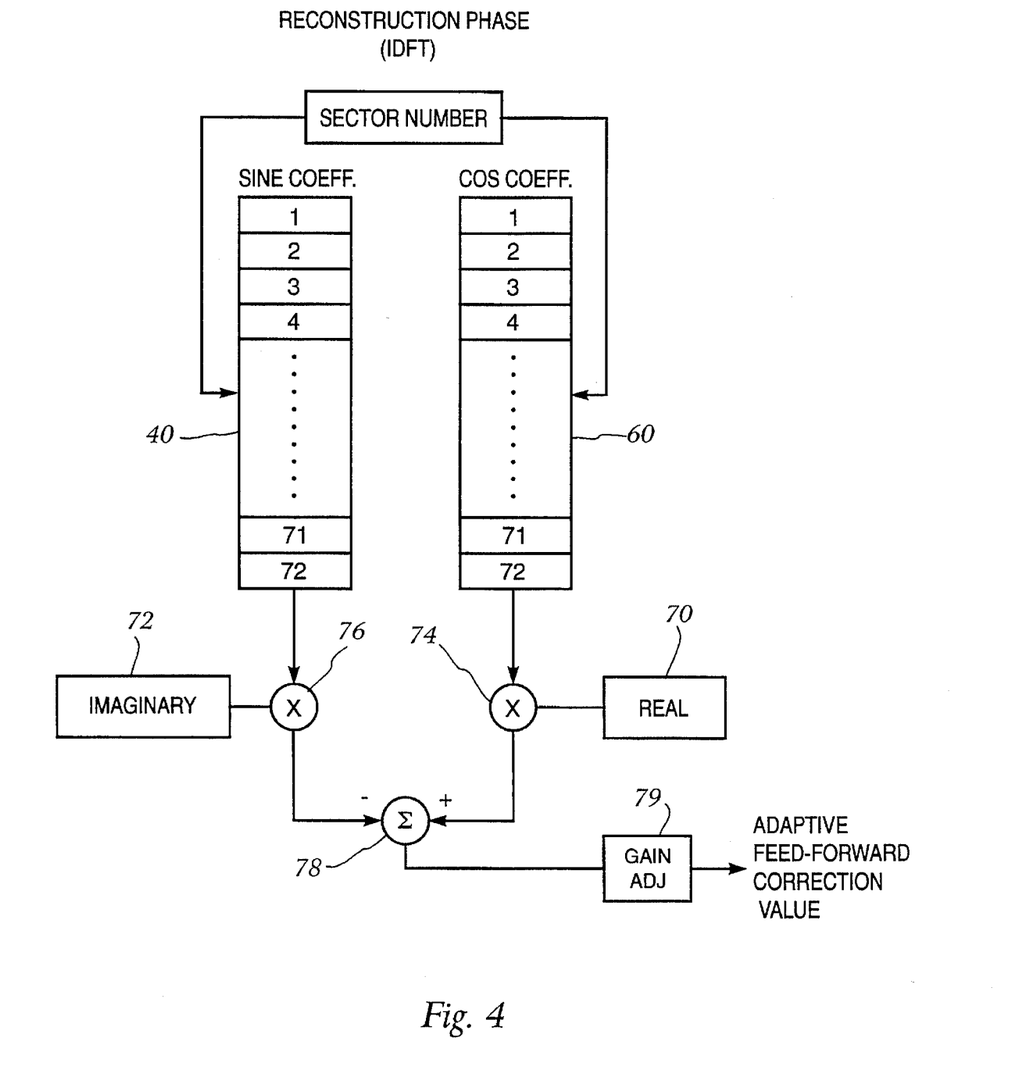
FIG. 4 is a conceptual view of the reconstruction phase associated with the adaptive feed-forward algorithm of the present invention.

FIG. 4 conceptually illustrates the frequency selective filter reconstruction phase 58 which in the preferred embodiment occurs during the disk revolution immediately succeeding the disk revolution(s) associated with the measurement phase. In the reconstruction phase, at each servo sector time the real term value from register 70 is multiplied by a cosine coefficient from look-up table 60, as indicated at 74, and the imaginary term value from register 72 is multiplied by a sine coefficient from look-up table 40, as indicated at 76. The inverse discrete fourier transform multiplications are algebraically summed, as indicated at 78, and multiplied by a gain adjustment constant, as indicated at 79. The gain adjustment constant corresponds to the reciprocal of one-half the number of servo samples occurring during the measurement phase (e.g., in a preferred embodiment for a measurement phase involving one revolution and seventy-two servo sectors, the gain adjustment constant is 1/36). The gain adjusted output from summing junction 78 provides an adaptive feed-forward correction value which in effect is a sine wave generated at the same frequency as runout (i.e., 90 hz for a disk with seventy-two servo sectors per track spinning at 5400 rpm). A different feed-forward correction value appears for each servo sector and is stored in adaptive feed-forward correction table 50.

Returning once again to FIG. 1, it will be recalled that fixed feed-forward correction table 34 stores a fixed feed-forward correction value for each servo sector sample interval. The fixed feed-forward correction values are computed using coefficients from a normalized sine wave and gain and phase values as described above. At each new track seek, a gain and phase update operation, indicated at 80, is performed on the gain and phase values for the zone in which the current track, i.e., the track currently being read or written to, is located. The gain and phase update operation involves observing the output of summing junction 38 during the reconstruction phase of the frequency selective filter operation, and determining new gain and phase values from this observation.

In particular, the maximum amplitude of the sine wave comprised of the algebraic sum of the fixed feed-forward correction values and the adaptive feed-forward correction values during the last measurement/computing cycle prior to track seek is detected. This algebraic sum becomes the updated gain value for the zone in which the current track is located. The number of servo sectors in the current track (e.g., seventy two in a preferred embodiment) is divided by four and the result (e.g., eighteen in the preferred embodiment) is subtracted from the number of the servo sector associated with the maximum amplitude of the adaptive feed-forward correction values, yielding the updated phase value for the zone in which the current track is located. The updated gain and phase values are subsequently stored in registers 42, 44 (see FIG. 2) for use the next time the read/write head returns to a track in that zone.

In similar fashion, the calibration phase associated with the fixed feed-forward correction value computations can be eliminated if desired by setting the gain and phase values in registers 42, 44 (see FIG. 2) to zero in all of the disk zones at the start of disk drive operation. The adaptive feed-forward computations of the present invention are performed as described above to provide all of the initial correction to the primary servo loop compensation signal at the first track seek. Prior to the next track seek, the gain and phase updates are obtained as described above and stored in registers 42, 44. The gain and phase updates become the gain and phase values for the zone in which the track currently being read or written to is located, and can be used for fixed feed-forward correction value computations during subsequent seeks to tracks in that zone. The process is repeated for each of the remaining zones at the first track seek into those zones to obtain gain and phase values for those zones.

To summarize the operation of the adaptive feed-forward algorithm of the present invention, computations of the discrete fourier transform at the runout frequency yield measurements of the repeatable runout (RUNOUT) left uncorrected by the primary servo loop operation. These repeatable runout measurements are added to the current adaptive feed-forward correction value ($AFF_{runout}$) at each servo sector interval. The real and imaginary terms are accumulated over the period of a full disk revolution. During the following disk revolution, this data is used to reconstruct a pure sine correction ($AFF_{applied}$) at the runout frequency, which correction is applied to the servo loop compensation signal and simultaneously stored in the adaptive feed-forward correction table as the current adaptive feed-forward correction waveform values. The entire process, essentially comprising a bandpass filter at the runout frequency, is repeated immediately during the next measurement/computation cycle. Expressed in algebraic form:

Revolution #1: $DFT_{runout}$= DFT [RUNOUT+ $AFF_{runout}$]

Revolution #2: $AFF_{runout}$= IDFT [$DFT_{runout}$]$AFF_{applied}$= $AFF_{runout}$ The adaptive feed-forward algorithm of the present invention is described in pseudo-code format as follows:

|  | REV. 1 | REV. 2 | REV. 3–10 | REV. 11 | REV. 12–19 | Rev. 20 |
|---|---|---|---|---|---|---|
| Cycle: | 1A | 1B | 2A | 2B | 3A | 3B |
| Function: | DFT Acquire | IDFT Reconstruct | DFT Acquire | IDFT Reconstruct | DFT Acquire | IDFT Reconstruct |
| AFF data: | None | Cycle 1A | Cycle 1A | Cycle 2A | Cycle 2A | Cycle 2A |

CONSTANT/VARIABLE DEFINITIONS

TOTAL_SECTORS=Number of servo sectors per revolution.
PHASE_OFFSET=Phase shift of servo loop at runout frequency (in servo samples.)
FAST_CYCLE=Sample length for fast cycle DFT measurement.
SLOW_CYCLE=Sample length for slow cycle DFT measurement.
FAST_GAIN=Gain used for fast cycle AFF update.
SLOW_GAIN=Gain used for slow cycle AFF update.
SECTOR=Current sector number (0 corresponds to the index sector, SECTOR is set to zero at the index).
FF_GAIN=Gain of the feed forward compensation.
FF-PHASE=Phase of the feed forward compensation.
STATE=Corresponds to the current AFF state.
CYCLE=Cycle counter.
AFF_GAIN=Gain of the AFF servo loop.
IDFT_GAIN=Gain for the IDFT reconstruction.
REAL=DFT real term.
IMAG=DFT imaginary term.
PES=Position error signal for current servo sector.
AFF_TABLE[X]=Entry X, in RAM table of AFF corrections (one entry for each sector).
SINE[X]=Entry X, in ROM table SINE[X]=SIN[X/TOTAL_SECTORS * 2
COSINE[X]=Entry X, in ROM table COSINE[X]=COS[X/TOTAL_SECTORS * 2
FF_COMPENSATION=Current total compensation value.
PHASE_PEAK=Phase at peak of FF sine compensation.
GAIN_PEAK=Amplitude at peak of FF sine compensation.
PHASE_DETECT=Phase at current GAIN_DETECT maximum.
GAIN_DETECT=Amplitude maximum of FF sine compensation.

The following is performed only as indicated, and not at every servo sector.

INITIALIZATION

At each cartridge insertion or power-on with cartridge only
1. FF_GAIN=0
2. FF_PHASE=0
3. STATE=1
4. CYCLE=FAST CYCLE
5. AFF_GAIN=FAST GAIN
6. AFF_TABLE[0..(TOTAL_SECTORS-1])=0
7. PHASE_PEAK=NULL
8. GAIN_DETECT=0
9. EXIT

FEED FORWARD SETUP

Before each seek (current zone to new zone) only
1. If PHASE_PEAK=NULL branch to step 4
2. FF_GAIN_TABLE [current zone]=GAIN_PEAK
3. FF_PHASE_TABLE [current zone]=PHASE_PEAK–[TOTAL_SECTORS/2+PHASE_OFFSET]
4. FF_GAIN=FF_GAIN_TABLE [new zone]
5. FF_GAIN=FF_PHASE_TABLE [new zone]
6. STATE=1
7. CYCLE=FAST CYCLE
8. AFF_GAIN=FAST_GAIN
9. AFF_TABLE[0..(TOTAL SECTORS-1)]=0
10. PHASE_PEAK=NULL
11. GAIN_DETECT=0
12. EXIT

TRACK FOLLOW ERROR

If PES exceeds maximum limits at any servo sector only
1. STATE=1
2. CYCLE=FAST_CYCLE
3. AFF_GAIN=FAST_GAIN
4. AFF_TABLE[0..(TOTAL_SECTORS-1)]=)
5. PHASE_PEAK=NULL
6. GAIN_DETECT=0
7. EXIT The following is performed at each servo sector interval.

AFF COMPENSATION

Compute FF compensation for next sector
1. X=[SECTOR–FF_PHASE] mod TOTAL_SECTORS
2. Y=SINE[X]
3. FF_COMPENSATION=Y * FF_GAIN
4. If STATE=2 branch to STATE 2
5. X=[SECTOR+ PHASE–OFFSET] mod TOTAL_SECTORS
6. FF_COMPENSATION=FF_COMPENSATION+FF_TABLE[X]
7. If STATE=1 branch to STATE 1

STATE 1=DFT acquisition

1. Y=PES * AFF_GAIN
2. Y=PES+AFF_TABLE[SECTOR]
3. REAL=REAL+Y* COSINE[SECTOR])
4. IMAG=IMAG–(Y* SINE[SECTOR])
5. CYCLE=CYCLE–1
6. If CYCLE !=0 then EXIT

7. CYCLE=TOTAL_SECTORS
8. IDFT GAIN=SLOW_CYCLE
9. STATE=2
10. EXIT

STATE 2=IDFT reconstruction

1. X=[SECTOR+PHASE_OFFSET] mod TOTAL_SECTORS
2. Y=IMAG * COSINE[X]
3. Y=Y−(REAL * SINE[X])
4. Y=Y/(IDFT_GAIN/2)
5. AFF_TABLE[X]=Y
6. FF_COMPENSATION=FF_COMPENSATION+Y
7. If FF_COMPENSATION< GAIN_DETECT branch to step 10
8. GAIN_DETECT=FF_COMPENSATION
9. PHASE_DETECT=X
10. CYCLE=CYCLE−1
11. If CYCLE !=0 THEN EXIT
12. PHASE_PEAK=PHASE_DETECT
13. GAIN_PEAK=GAIN_DETECT
14. CYCLE=SLOW CYCLE
15. AFF_GAIN=SLOW_GAIN
16. STATE=1
17. GAIN_DETECT=0
18. EXIT When viewed in its entirety, the adaptive feed-forward algorithm of the present invention functions to update the servo compensation signal every other revolution. The measurement phase calculations effectively provide a "best fit" to the position error signals, which otherwise include noise. That is, the measurement phase determines the gain and phase of a 90 Hz correction waveform which best fits the incoming servo sample data comprising position error signals generated at each servo sector sample time. The previously determined compensation signal is used during the measurement phase and updated during the reconstruction phase.

It should now be apparent that the present invention allows for larger mechanical tolerances on disk hub and spindle nose mating surfaces. Larger tolerances mean greater chance for the two mating surfaces to move relative to one another under conditions of shock or vibration. This relative movement changes the runout signature, which would normally go uncorrected or require a recalibration but which can now be accounted for with the adaptive feed-forward algorithm of the present invention. The algorithm also compensates for changes in the mechanical plant which result in gain and phase variations at the runout frequency. Such plant variations directly affect the performance of conventional feed forward systems by allowing the correction measured before the plant changed to be applied at some level of error on the changed plant. This type of plant variation is a common problem in small disk drives with voice coil motors and bearings of small mass.

The present invention has been set forth in the form of two preferred embodiments. It is nevertheless intended that modifications to the adaptive feed-forward algorithm of the present invention as disclosed herein, such as modification for use in an optical disk drive environment, may be made by those skilled in the art without departing from the scope and spirit of the present invention. Moreover, such modifications are considered to be within the purview of the appended claims.

I claim:

1. A method of correcting for repeatable runout in a rotating data storage apparatus, the rotating data storage apparatus including a rotating disk having at least one data track with a centerline and servo information recorded in a plurality of servo sectors along the data track, the rotating data storage apparatus also having a head structure for reading the servo information from the servo sectors as the disk rotates and a servo processing structure for generating a position error signal at each servo sector on the disk based on the servo information read by the head structure as the disk rotates, the position error signal representing misalignment between the head structure and the centerline of the data track, said method comprising:

defining a predetermined measurement cycle and a predetermined reconstruction cycle;

performing a discrete fourier transform on the position error signal at each servo sector during said predetermined measurement cycle to obtain real and imaginary terms;

accumulating said real and imaginary terms for all of the sampled servo sectors in the track during said predetermined measurement cycle;

reconstructing a fixed feed-forward correction waveform during said predetermined reconstruction cycle, using said accumulated real and imaginary terms, said fixed feed forward correction waveform corresponding to the repeatable runout occurring during said predetermined measurement cycle;

storing said fixed feed-forward correction waveform;

defining subsequent measurement cycles and subsequent reconstruction cycles;

performing a discrete fourier transform on the position error signal at each servo sector during each of said subsequent measurement cycles to obtain real and imaginary terms;

accumulating said real and imaginary terms for all of the sampled servo sectors in the track during each of said subsequent measurement cycles;

reconstructing an adaptive feed-forward correction waveform during each of said subsequent reconstruction cycles, using said real and imaginary terms accumulated during each of said subsequent measurement cycles, said adaptive feed-forward correction waveform corresponding to the changes in the runout; and algebraically summing said adaptive feed-forward correction waveform, said fixed feed-forward correction waveform and the position error signals during each of said subsequent measurement cycles to provide a position error signal corrected for the effects of repeatable runout.

2. A method of correcting for repeatable runout in a rotating data storage apparatus, the rotating data storage apparatus including a rotating disk having at least one data track with a centerline and servo information recorded in a plurality of servo sectors along the data track, the rotating data storage apparatus also having a head structure for reading the servo information from the servo sectors as the disk rotates, said method comprising:

generating a position error signal at each servo sector on the disk based on the servo information read by the head structure;

determining a fixed feed-forward correction waveform for each servo sector as a function of measured repeatable runout;

determining an adaptive feed-forward correction waveform for each servo sector as a function of changes in the repeatable runout; and summing algebraically said fixed feed-forward correction waveform, said adaptive feed-forward correction waveform, and said position error signal to provide a position error signal corrected for the effects of repeatable runout.

3. The method of claim 2 wherein the step of generating a position error signal at each servo sector on the disk further comprises;

reading the servo information recorded in each of the servo sectors along the data track;

processing the servo information which has been read to generate an analog position signal representative of the position of the head structure relative to the data track centerline;

converting the analog position signal to a digital position signal; and combining algebraically a reference position value with the digital position signal, yielding the position error signal.

4. The method of claim 2 wherein the step of determining a fixed feed-forward correction waveform for each servo sector further comprises:

calibrating the disk upon predetermined conditions;

computing a fixed feed-forward correction value for each servo sector along the data tracks; and storing the computed fixed feed-forward correction values.

5. The method of claim 4 wherein the step of calibrating the disk upon predetermined conditions further comprises:

dividing the data tracks into zones;

selecting a data track within each zone;

obtaining the position error signal from each servo sector in the selected track within each zone;

averaging the position error signal at each servo sector in the selected track within each zone for a predetermined number of revolutions of the rotating disk, yielding a repeatable runout signature waveform for each zone;

comparing a normalized waveform with the repeatable runout signature waveform;

determining a gain value for each zone;

determining a phase value for each zone; and storing the determined gain and phase values for each zone.

6. The method of claim 5 wherein the step of determining the gain value for each zone further consist of:

defining a series of decreasing gain factors;

deriving a cumulative difference value for each zone by summing the absolute difference between the value of the repeatable runout signature waveform and the normalized waveform for each of the servo sectors along the selected track within the zone;

repeating the derivation of the cumulative difference value using a series of scaled versions of the normalized waveform obtained by multiplying the normalized waveform by the series of decreasing gain factors;

comparing each derived cumulative difference value with all other derived cumulative differences values for each zone; and identifying as the gain value for each zone the gain factor which yields the lowest derived cumulative difference value.

7. The method of claim 5 wherein the step of determining the phase value for each zone further comprises:

scaling the normalized waveform with the gain value;

phase shifting the scaled normalized waveform in single sector increments;

deriving a cumulative difference value for each phase shift by summing the absolute difference between the value of the repeatable runout signature waveform and the scaled, phase-shifted normalized waveform for each of the servo sectors of the track within each zone;

comparing each derived cumulative difference value with all other derived cumulative difference values;

identifying the lowest derived cumulative difference value for each zone; and determining as the phase value the difference in phase between the phase-shifted normalized waveform corresponding to the lowest derived cumulative difference value and the normalized waveform, for each zone.

8. The method of claim 5 wherein the step of computing the fixed feed-forward correction value for each servo sector further comprises:

using the phase value for the zone in which the servo sector lies and the position of the servo sector on the disk to select a coefficient of the normalized waveform; and multiplying the selected coefficient of the normalized waveform with the gain value for the zone in which the servo sector lies.

9. The method of claim 5 further comprising the step of updating the gain and phase values for a zone in which a data track is being read.

10. The method of claim 9 wherein the step of updating the gain and phase values further comprises:

observing an algebraic sum of the position error signal, the fixed feed-forward correction waveform, and the adaptive feed-forward correction waveform; and identifying as the updated gain value the maximum amplitude of the algebraic sum; and performing a predetermined algebraic operation on a position number associated with the servo sector corresponding to the maximum amplitude of the sum, yielding the updated phase value.

11. The method of claim 2 wherein the step of determining an adaptive feed-forward correction waveform for each servo sector further comprises:

multiplying the position error signal by a predetermined gain factor to yield a scaled position error signal;

summing the scaled position error signal with a stored adaptive feed-forward correction value;

processing the sum in a frequency selective filter; and updating the stored adaptive feed-forward correction value.

12. The method of claim 11 wherein the step of processing the sum in a frequency selective filter further comprises:

performing a discrete fourier transform on the scaled position error signal at each servo sector during the measurement cycle to obtain real and imaginary terms;

accumulating the obtained real and imaginary terms during the measurement cycle; and reconstructing a waveform correction during the reconstruction cycle by performing an inverse discrete fourier transform on the accumulated real and imaginary terms.

13. The method of claim 12 wherein the step of performing a discrete fourier transform on the scaled position error signal further comprises:

multiplying the scaled position error signal by predetermined cosine and sine coefficients which correspond to the servo sector from which the position error signal originated, yielding a real term and an imaginary term.

14. The method of claim 12 wherein the step of reconstructing a waveform correction further comprises:

multiplying the accumulated real term by a predetermined cosine coefficient for each servo sector;

multiplying the accumulated imaginary term by a predetermined sine coefficient for each servo sector;

summing algebraically the multiplied real terms and imaginary terms; and multiplying the algebraic sum by a predetermined gain adjustment constant.

15. A servo correction apparatus for use in the servo control circuit of a disk drive which includes a data storage medium, the data storage medium having disposed thereon a plurality of recording tracks, each of the recording tracks having recorded therein a plurality of servo sectors containing servo information indicative of the location of a recording track reference position, the disk drive also including at least one read/write head adapted to read data from and write data to the surface of the rotating data storage medium, a head mover supporting the read/write head for movement to a desired recording track location, and read channel circuitry connected to the head for generating position signals representative of the head position relative to the recording track reference position in response to the reading of servo information by the head, said servo correction apparatus comprising:

a state machine connected to the read channel circuitry, said state machine including input circuitry which receives the position signals generated by the read channel circuitry and provides corresponding position error signals, an adaptive feed-forward servo loop which receives the position error signals and generates adaptive feed-forward correction values, a fixed feed-forward servo loop with a fixed feed-forward correction table which stores fixed feed-forward correction values, a first summing junction which outputs an algebraic combination of said adaptive feed-forward correction values and said fixed feed-forward correction values, a second summing junction which algebraically combines the output of said first summing junction with the position error signals, and servo output circuitry which receives the output of said second summing junction and provides servo compensation signals;

said servo correction apparatus further comprising drive circuitry connected to receive said servo compensation signals and capable of actuating the head mover to bring the head back into alignment with the recording track reference position.

16. A servo correction apparatus as set forth in claim 15, wherein said adaptive feed-forward servo loop in said state machine includes a frequency selective filter which generates said adaptive feed-forward correction values in response to the position error signals input to said state machine and an adaptive feed-forward correction table which stores said adaptive feed-forward correction values and supplies said stored adaptive feed-forward correction values to said first summing junction for algebraic combination with said fixed feed-forward correction values.

17. A servo correction apparatus as set forth in claim 16, wherein said frequency selective filter is a discrete fourier transform filter.

18. A servo correction apparatus as set forth in claim 16, wherein said adaptive feed-forward servo loop further includes a third summing junction which algebraically combines the position error signals input to said state machine with said adaptive feed-forward correction values stored in said adaptive feed-forward correction table, said third summing junction connected to provide said frequency selective filter with the output of said third summing junction.

19. A servo correction apparatus as set forth in claim 18, further including a multiplication structure for multiplying the position error signals by a gain factor prior to inputting the position error signals to said third summing junction.

20. A servo correction apparatus as set forth in claim 16, wherein said fixed feed-forward servo loop further includes a structure for computing and storing updated phase and gain values derived from said algebraically combined adaptive feed-forward correction values and fixed feed-forward correction values, said updated phase and gain values being supplied to said fixed feed-forward correction table for updating said fixed feed-forward correction values.

* * * * *